United States Patent [19]
von Winckelmann

[11] Patent Number: 5,035,536
[45] Date of Patent: Jul. 30, 1991

[54] OIL SPILL RETRIEVAL SYSTEM

[76] Inventor: Emil H. von Winckelmann, 3108 Blossom La., Redondo Beach, Calif. 90278

[21] Appl. No.: 587,084

[22] Filed: Sep. 24, 1990

[51] Int. Cl.⁵ .............................................. E02B 15/04
[52] U.S. Cl. ....................................... 405/60; 405/64; 405/68
[58] Field of Search ........................ 405/60, 63, 64, 68, 405/52; 210/923

[56] References Cited

U.S. PATENT DOCUMENTS 3,839,870 10/1974 Ryan ....................................... 405/64
4,047,390 9/1977 Boyce ................................ 405/60 X

FOREIGN PATENT DOCUMENTS 1063367 10/1979 Canada .................................. 405/60
7712103 5/1978 Netherlands .......................... 405/60

Primary Examiner—David H. Corbin

[57] ABSTRACT

An oil retrieval system comprising a large sheet which is adapted to be spread over an oil spill, having weights provided at the respective corners of the sheet and air bags attached to the respective weights, so that when the air bags are deflated the weights will sink and draw the sheet into a canopy over the oil trapping the oil in the canopy, and a retrieval hose extending through the sheet which may be attached to an appropriate pump for retrieval of the oil trapped in the canopy.

2 Claims, 2 Drawing Sheets

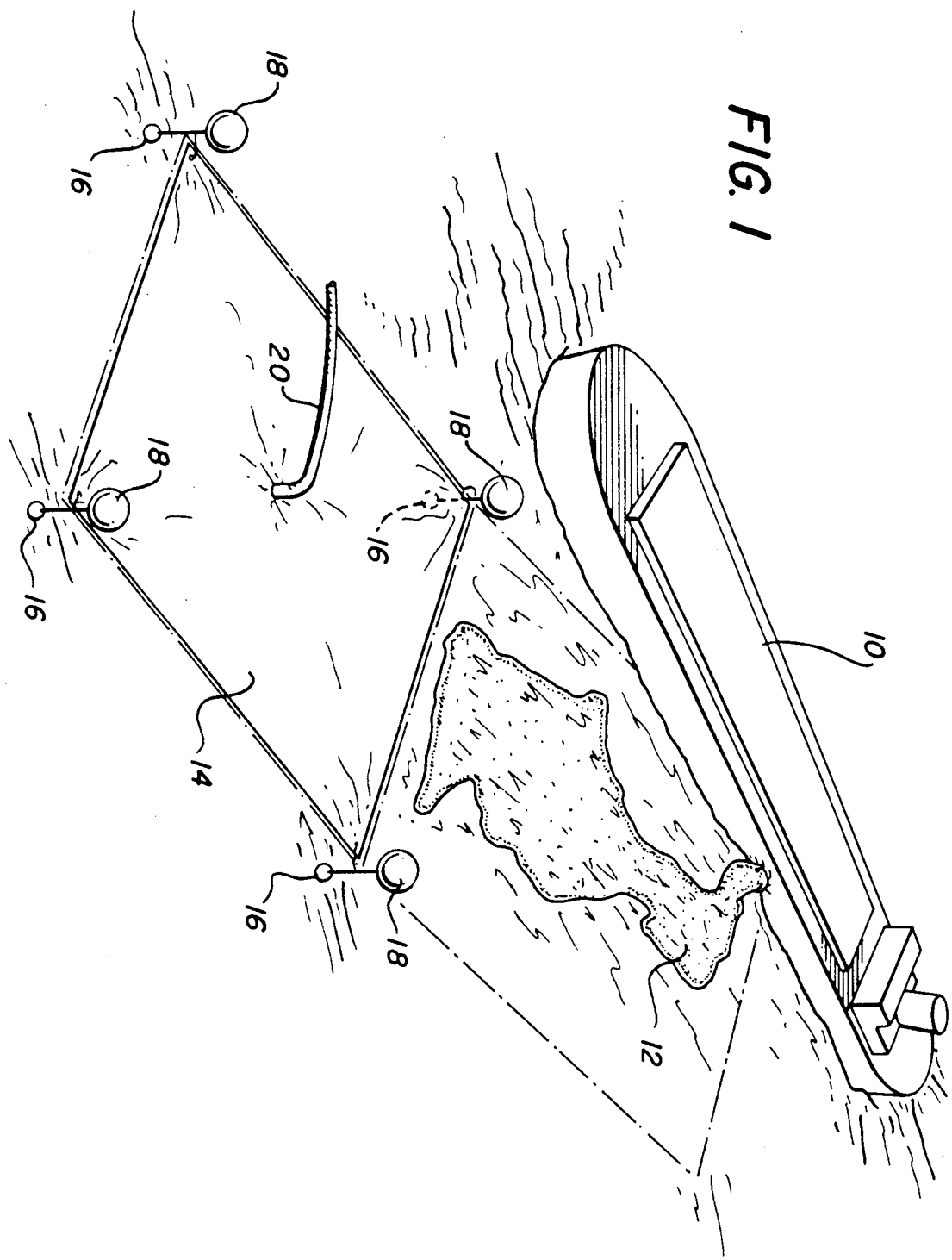

OIL SPILL RETRIEVAL SYSTEM

BACKGROUND OF THE INVENTION

Oil spills from tankers have become prevalent in recent years with devastating results. Many methods and devices have been suggested in the past, hopefully for preventing such oil spills; and for attempting to clean up and contain the oil spills after they have occurred. However, for the most part, such prior art and systems for one reason or another have remained largely devices and systems for one reason or another have remained largely ineffective. It is an objective of the present invention to provides an improved and effective system, not only for containing oil spills, but for recovering the oil from the spills.

SUMMARY OF THE INVENTION

In accordance with the invention a large sheet is provided to be carried by individual oil tanker's, or by individual auxiliary vessels provided specifically for containing oil spills. The sheet may normally be carried, for example, in a rolled or folded condition. In the event of an oil spill, the sheet is deployed and spread over the leading section of the oil spill. Weights are provided at the respective corners of the sheet, and air bags are attached to the respective weights. The air bags are normally inflated, but when the sheet is in place, the air bags are deflated. This causes the weights to sink and draw the sheet into a canopy over the oil, thereby trapping the oil within the canopy. A retrieval hose is provided which extends through the sheet, and which may be attached to a pump on the oil tanker, or on the auxiliary vessel, for retrieving the oil.

BRIEF DESCRIPTION OF THE DRAWINGS

FIG. 1 is a schematic representation of an oil tanker and of oil leaking from the tanker, and also showing one embodiment of the system of the invention for containing and recovering the oil.

DETAILED DESCRIPTION OF THE INVENTION

An oil tanker is designated 10 in FIG. 1, from which oil is leaking and spread over the adjacent water as an oil spill designated 12.

Figure 2:
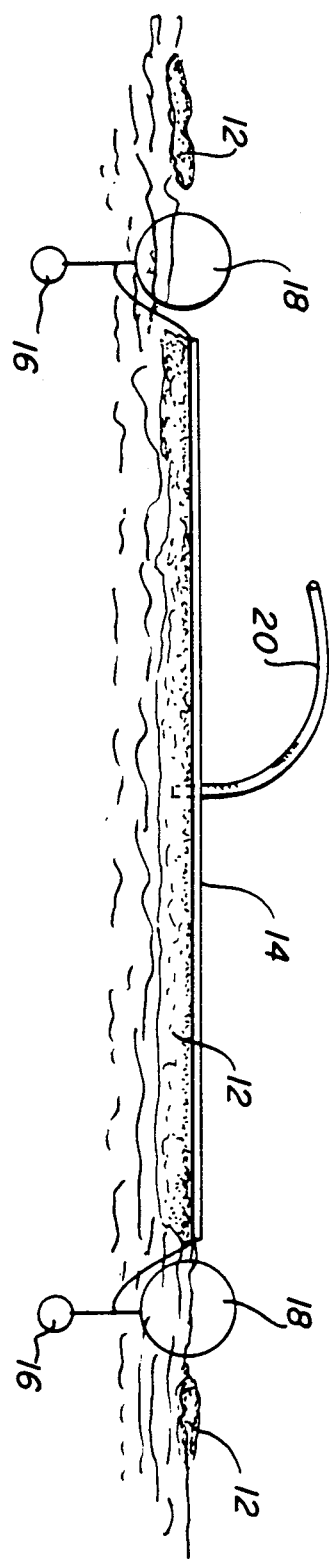
FIG. 2 is an elevational view showing the system in place of a section of the oil spill.

In the practice of the invention, a sheet 14 is carried by the tanker, or by an auxiliary vessel, and the sheet is deployed and spread over the leading section of the oil spill, as shown in FIG. 1 and 2. Weights 16 are suspended from each corner of the sheet 14, and a corresponding air bags 18 is attached to each weight. The air bag 18 are normally inflated, and serve to prevent the weights 16 from sinking into the water.

Figure 3:
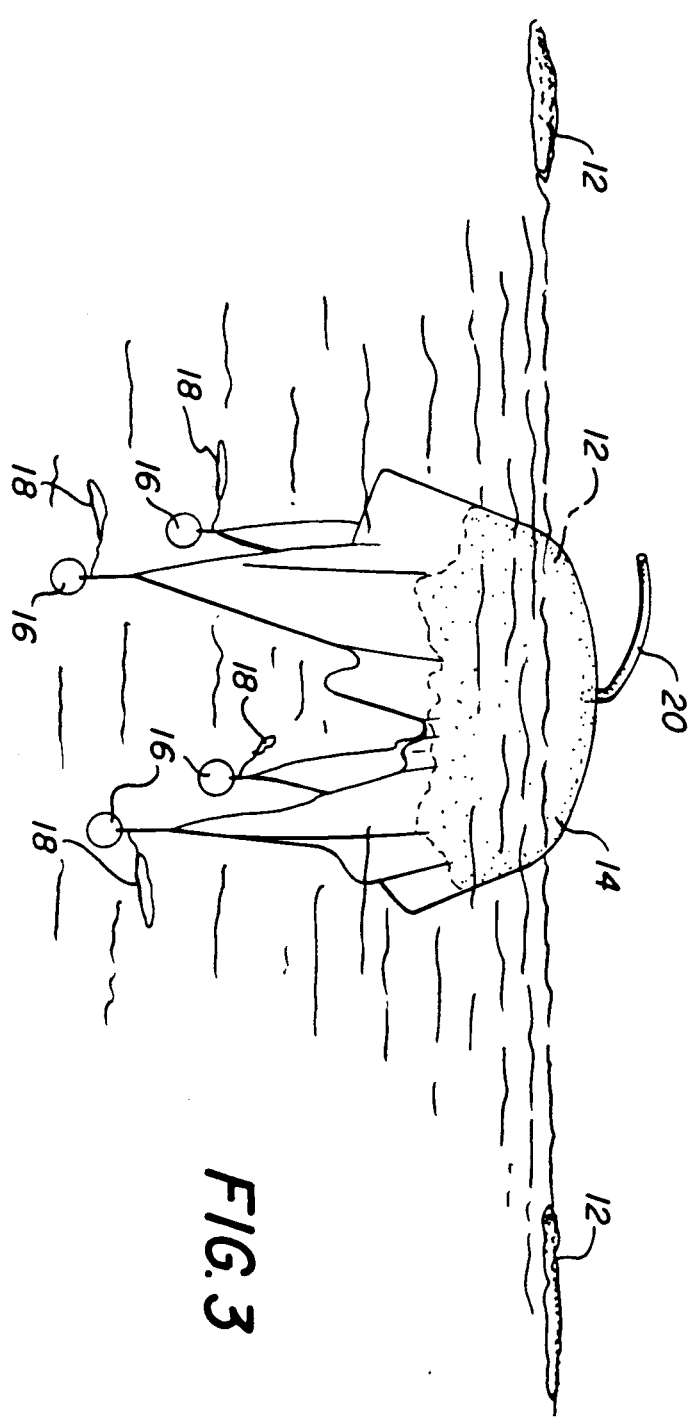
FIG. 3 is an elevation showing the sheet component of the system drawn into a canopy and trapping oil from the spill within the canopy to be retrieved by a hose extending through the sheet, the hose being coupled to appropriate pumps on the tanker, or on an auxiliary vessel.

However, when sheet 14 is in place, as shown in FIG. 2, for example, the air bags are deflated, causing the weights 16 to sink to the position shown in FIG. 3, at which the sheet 14 is drawn as a canopy over the section of the oil spill covered by the sheet. The oil trapped within the sheet may then be retrieved by means of a hose 20 which extends through the sheet, and which is coupled to appropriate pumps on the oil tanker, or an auxiliary vessel.

The procedure described above may then be repeated for each section of the oil spill, as the oil leaks out of the tanker.

The invention, provides, therefore, a simple and expedient system for effectively trapping an oil spill, and for retrieving the oil of the oil spill.

It will be appreciated that while a particular embodiment of the invention has been shown and described, modifications may be made. It is intended in the claims to cover all modifications which come within the true spirit and scope of the invention.

I claim:

1. An oil spill retrieving system for retrieving oil from the surface of a body of water comprising: a sheet adapted to be spread on the surface of the body of water to extend over at least a section of the oil on the surface of the body of water; a plurality of weights attached to the peripheral edge of said sheet; a corresponding plurality of air bags attached to respective ones of the weights for holding said sheet on the surface of the body of water when the bags are inflated and for preventing the weights from sinking when the air bags are inflated, and for permitting the weights to sink when the air bags are deflated to cause the weights to draw the peripheral edge of the sheet down into the body of water to form the sheet into a canopy over the oil in the section to trap the oil within the canopy; and a hose extending through the sheet to enable the oil trapped in the canopy to be retrieved.

2. The retrieval system defined in claim 1, in which the sheet has a rectangular configuration, and in which the weights are attached to the respective corners of the sheet.

* * * * *